tates Patent Office 3,027,330
Patented Mar. 27, 1962

3,027,330
HEAT RESISTING MATERIALS AND METHODS
FOR THEIR MANUFACTURE
Nils Gustav Schrewelius, Hallstahammar, and Karl Herbert Joachim Medin, Lidingo, Sweden, assignors to Aktiebolaget Kanthal, Hallstahammar, Sweden
No Drawing. Filed May 6, 1957, Ser. No. 657,058
Claims priority, application Sweden Apr. 27, 1953
11 Claims. (Cl. 252—518)

This application is a continuation-in-part of our application Serial No. 388,444, filed on October 26, 1953, now abandoned, and relates to heat resisting materials the chief constituents of which are silicides and oxides. The materials are manufactured by a powder metallurgical process.

Such materials must have a high degree of resistance to oxidation which necessitates a relatively now porosity. The materials must have sufficient mechanical strength and not be unduly brittle in order to permit normal handling at room temperature and in order to withstand conventional service conditions. As will be hereinafter described, the foregoing characteristics of the materials will vary with the compositions thereof.

Some of the materials made according to the present invention are particularly suitable as electrical resistances to be used at high temperatures. For such materials it is important that they possess suitable electrical resistance characteristics.

In a material consisting of a conductor, such as a silicide, and ceramic constituents such as $SiO_2$, the conductivity of the material will decrease with increasing percentages of the ceramic constituents. At contents of 70% to 80% by weight of the ceramic constituents, the material will no longer be conductive since direct electrical contact between silicide granules is substantially completely interrupted by the presence of the non-conductive ceramic granules.

At low temperatures, the conductivity appears to depend substantially entirely on the electrically conducting silicide component. The condition becomes different at high temperatures, i.e., above 800 to 1000° C. At such temperatures most ceramic materials have a certain degree of conductivity which increases rapidly with increasing temperature in these ranges.

These conditions result in the fact that the conductivity of materials composed essentially of silicide and ceramic materials have pronounced maximum values at certain temperatures and pronounced minimum values at other temperatures. This results in considerable difficulty in the utilization of such materials and gives rise to the necessity of providing material of definite composition ranges for use in specific applications as will be hereinafter more fully described.

According to this invention, the improved heat resistant material is composed essentially of a silicide component constituting from 35 to 99% by weight of the material and an oxide component, constituting 1 to 65% by weight of the material and consisting of silica and, if desired, of one or more of the oxides $Al_2O_3$, BeO, $ZrO_2$, $Y_2O_3$ and/or oxides of other rare earth metals. The oxide component may also contain small quantities of oxides of the metal atoms included in the silicide component. The silicide component consists of one or more silicides of the average formula $MSi_x$ in which M is one or more of the metal atoms Mo, Cr, V, Ti, Zr and Ta and $x$ being from 0.6 to 2. The three remaining metals of the so called transition metals in groups IV, V and VI of the periodic system, i.e. W, Nb and Hf, afford great similarities with Mo, Ta and Zr respectively in that the properties of the material will not be considerably affected if they are included amongst the other metal atoms. However, the metal Hf is very expensive and difficult to obtain so that it would scarcely be a practical proposition to use it. The metals W and Nb are less advantageous and more expensive than Mo and Ta respectively. However, unless stated to the contrary, whenever Mo, Ta and Zr are mentioned, also W, Nb and Hf respectively may be included. In the oxide component the silica content may be from 1 to 60% by weight of the material and, if there is any other oxide or oxides, this or these respectively may constitute totally 0 to 60% by weight of the material.

It is a known fact that certain metal ions, particularly those of Mo and W, reduce the surface tension of certain ceramic masses considerably. Certain other metal ions, such as those of vanadium, have a similar influence although much weaker. In sintering of objects containing molybdenum silicide a small portion of the silicide will be oxidized, molybdenum ions then being formed which are solved in the silica formed at the same time in the oxidation process. A similar solution of molybdenum ions is assumed to take place in sintering cerametallic compositions of molybdenum silicide and an oxide component containing silica. An essential feature in our patent application Ser. No 388,444 is that the sintering is facilitated by the silica being present in the powder metallurgical manufacture of heat resistant materials containing a silicide component and an oxide component. It is mentioned also in our said application that an addition of such substances which lower the melting point or reduce the surface tension of silica, will facilitate this sintering-promoting function of the silica to a high degree. To the silica, molybdenum ions may be supplied in two principally different ways, i.e. the one consisting in oxidizing the silicide component and the other in adding, to the oxide component, before starting the powder metallurgical manufacture, molybdenum oxide or other suitable molybdenum compound. Molybdenum is, however, a weakly positive metal and it is thus self-evident that in oxidizing a silicide component, containing in addition to molybdenum also a more positive metal, such as titanium, the appearance of molybdenum ions in the oxide components will be more or less suppressed. Before all, this will occur when the more positive silicide component is solvable in silica, such as in the case of $TiO_2$. On the other hand, chromium oxide is not soluble in silica and the presence of chromium in the oxide component does thus not disturb, to any appreciable degree, the oxidation of the molybdnum silicide into molybdenum ions and silica (compare Example 9 given below).

It has now been found in practice that if the silicide component includes a quantity of molybdenum being essentially less than from 50 to 60% by weight of the silicide component the concentration of molybdenum ions will be reduced in the oxide component and the action of these ions to lower the surface tension for the silica correspondingly weakened whereby the sintering of the heat resistant material will no more be sufficiently facilitated. In such a case it will be necessary to supply molybdenum oxide to the silica in the raw material, preferably in a preparatory step of melting or sintering. In Example 11 cited below there is included as a silicide component 8% Ti, 56% Mo and 36% Si. In the oxidation during the final sintering there are formed about ten parts $SiO_2$ which constitute the oxide component of the material together with five parts $Al_2O_3+.25$ parts $SiO_2$ containing traces of $MoO_3$ originally added. The silica formed in the oxidation of the silicide component will also include traces of oxides of Ti which, due to its stronger positive character, will suppress those Mo ions which otherwise would have appeared in the silica layer around the silicide grains. For this reason it will be necessary in Example 11 to introduce a surplus of Mo ions in the oxide component already from the beginning in order to obtain such a reduction in the surface tension of $SiO_2$ that will favor the sintering process. Further, the sintering may be facilitated in another way, for instance, by producing a liquid phase in the sintering process. In the systems Ti—Si and Zr—Si it is known that there are low melting eutectics. In the system Ti—Si there are two such eutectics corresponding to 8.5 and 78% by weight of Si both having a melting point of 1330° C. The presence of such an easily fusible silicide component may, to a certain degree, form a substitute for the molybdenum ions which would otherwise assist the function of the silica by their reduction of the surface tension.

In the Example 10 below there is a molybdenum silicide poor in Si combined with a low melting titanium silicide rich in Si so that the composition of the silicide component corresponds to a mixture of disilicides $(Ti_{0.27}Mo_{0.73})Si_2$.

As stated above, also vanadium ions have a similar influence on the surface tension of the silica and it will be possible to sinter a material containing solely vanadium silicide and silica into dense products without any particular addition of molybdenum ions.

Oxide components in products according to the invention may, as above stated, contain in addition to silica one or more of the oxides BeO, $Al_2O_3$, $ZrO_2$ and rare earths. Said oxides may be combined in a way well known for a man skilled in the art of ceramics and it is possible to manufacture oxide components having particularly advantageous properties. Due to its very good resistance against temperature fluctuations and its low specific weight beryllium oxide is used in certain ceramic combinations known before. In Example 8 below there is included, in addition to a small quantity of pure silica favoring the sintering, a ceramic component which is well known as a heat resisting material under the commercial designation "4811 C." The composition hereof corresponds to the formula $48BeO—2Al_2O_3—ZrO_2$ together with a small quanity of CaO. This ceramic component is preferably manufactured in advance in known manner through reaction between the oxides included. Both zirconium oxide and zirconium silicate have good heat resistivity but less favorable resistivity against temperature changes so that products having high contents of these oxides should thus not be applied in cases where intense fluctuations of temperature occur. Aluminium oxide, such as corundum, has good mechanical strength and also a very high degree of hardness and is suitable as grinding means.

Oxide components consisting of a preponderant portion of silica glass, such as according to Example 11, obtain a good resistivity against temperature fluctuations due to the low thermal expansion coefficient of the silica.

The silicide component may include silicides having 37½–66⅔ atomic percent Si which may also be written $M_5Si_3$ to $MSi_2$ in which M is a transition metal. The disilicides have the advantage of having a high resistivity against oxidation attacks whereas the silicides $M_5Si_3$ have a higher thermodynamic stability which appears, inter alia, therein that they do not react quite as easy with, for instance, oxides as the disilicides do. In its special class $MoSi_2$ has the highest resistivity against oxidation attacks whereas $TaSi_2$, due to its high melting point of 2400° C. and a certain plastic workability imparts toughness and high mechanical strength to products having a high content of tantalum silicide, such as in Example 12 below.

The size of grain for material according to the invention should be small, preferably less than about 10 microns. Before all this relates to the silicide component which could not be made to sinter to a low porosity if the grains are too coarse. It is more advantageous to make also the ceramic component with a grain size being less than 10 microns. In this connection the statement that the size should be less than 10 microns means that 90% by weight of the material has a grain size less than 10 microns.

As regards the porosity of the final product it is advantageous to have a porosity as low as possible. The present invention is not restricted to the porosity being below 10% by volume. It is, however, self-evident that both mechanical strength and resistivity against oxidation attacks will suffer if the porosity becomes too high, particularly if the portion of throughgoing pores becomes high.

Products according to the invention may find many practical applications. As structural parts (see Example 12) in apparatus and machines in which a high resistivity against oxidation attacks in combination with a high heat resistance are desirable such materials may be used particularly for the temperature range of 1.000–1.400° C.

As electric resistance elements for the generation of high temperatures up to 1700° C. those materials are particularly suitable in which the silicide component substantially contains Mo, Ti, V or W, such as in Examples 9 and 11. It is particularly advantageous for the resistance element to use materials the silicide component of which consists of $MoSi_2$ and the oxide component of which consists of $SiO_2$ and $Al_2O_3$. Such compositions afford a good resistivity to heat and have satisfactory electrical properties. They will be treated in another connection. Through the addition of such oxides which are electrically insulating also at high temperatures, such as $SiO_2$, $Al_2O_3$ and BeO the specific resistance may be increased at will and by the addition of certain other disilicides, such as those of Cr, Ti and Ta, also the temperature coefficient of the resistance may be varied from a positive to a negative value which may be very useful for special purposes.

It is also possible to use material according to the invention for cold resistances, for instance, in case only an ohmic resistance without the generation of heat is desired, compare Example 4. Further, the material may be used in cathodes and in many other applied fields of electrotechnics.

Such materials which have hard oxide components, for instance, of corundum are suitable as abrasive and they can further be applied as protecting tubes for thermoelements (Example 11) and in certain cases also as such elements proper and further, in the chemical industry, as containers of different kinds, such as crucibles, muffles and tubes and nozzles which all must be resistant to corrosion and heat fluctuations.

As stated above some of the materials according to this invention are applicable in electrical resistor adapted for very high temperatures. In respect of such materials the silicide component consists substantially entirely of $MoSi_2$. However, the addition of small quantities of $TaSi_2$ and $TiSi_2$, i.e., up to 10% by weight of the silicide component, have been found to improve the mechanical strength of the material and to have a favorable influence on the electrical properties of the material as will be hereinafter described.

The oxide component is composed of $SiO_2$ with or without the addition of $Al_2O_3$ in quantities hereinafter set forth.

Materials having silicide and oxide components have been found to be particularly suitable for use as electrical resistance materials at temperatures ranging between 1400° to 1700° C. It will be evident that such materials must have extremely high resistance to oxidation attacks. $MoSi_2$ is the most resistant of the silicides and the addition of any substantial quantity of other silicides reduces the oxidation resistance of the material. However, as previously noted, small additions of $TaSi_2$ and $TiSi_2$ improve the mechanical strength of the material and the temperature coefficient of electrical resistance of the material. For pure $MoSi_2$ the specific electrical resistance is 0.4 ohm mm.$^2$/m. at 20° C.,
1.9 ohm mm.$^2$/m. at 800° C., and
3.0 ohm. mm.$^2$/m. at 1600° C., whereas the corresponding values for $MoSi_2+10\%$ $TiSi_2$ are 1.1, 2.2, and 3.0 ohm mm.$^2$/m. respectively. If higher contents, i.e., above 10%, of such other silicides are included in addition to $MoSi_2$ the ability to endure violent temperature changes is substantially reduced.

As previously noted, most ceramic materials become conductive at elevated temperatures, and $MoSi_2$ at temperatures between 1500° C. and 1700° C. has only a small positive temperature coefficient of electrical resistance, i.e., at 1500° C. 2.9 and at 1700° C. 3.1 ohm mm.$^2$/m. It is, therefore, important that any oxide added does not have a pronounced negative coefficient of electrical resistance since the resulting temperature coefficient of the material may be negative. Materials having such negative characteristics at operating temperatures are not suitable as electrical resistance materials and the present invention is thus concerned only with oxides having low electrical conductivity even at high temperatures. Thus, only $SiO_2$ and $Al_2O_3$, which do not have a pronounced negative coefficient of electrical resistance, are employed for the production of electric resistance materials. Furthermore, both of these oxides having exceedingly low conductivity even in these elevated temperatures.

In addition to the foregoing, $SiO_2$ has the further desirable effect of facilitating the sintering of the grains of material forming the silicide and oxide components as will be hereinafter described. The $Al_2O_3$ is additionally desirably employed for the reason that it has a coefficient of linear thermal expansion which agrees exactly with the coefficient of expansion of $MoSi_2$ at temperatures between 20 and 1500° C.

It has been found that at least 90% of all of the silicide and oxide particles before sintering must have a grain size less than 10 microns if a product of suitable high density and low pore volume is to be obtained. The relative pore volume should not exceed 10% if the resulting product is to have a good mechanical strength and sufficient resistance to oxidation. In the sintering process there is always a certain amount of grain growth, particularly if the quantity of oxide material is small. If higher contents of oxide material are employed, for example over 20%, the grain growth will be insignificant in sintering, and after long periods of use of the final product at high temperatures the grain growth will not exceed 20 to 50%. In the present invention involving finely divided particles the silica assists the sintering, i.e., it renders a "wetting" action between the silicide grains and the oxide grains.

As previously noted, it has been found that the composition of the oxide component and its percentage in the heat resistant material are interdependent to a certain degree. It has been found that substantially four different types of heat resistant materials may be manufactured having oxide components in percentages by weight as follows:

*Type I.*—Oxide component 1 to 4% of the material, composed of 1 to 4% of $SiO_2$ and 0 to ½% $Al_2O_3$.
*Type II.*—Oxide component 4 to 20% of the material, composed of 4 to 20% $SiO_2$ and 0 to 3% $Al_2O_3$.
*Type III.*—Oxide component 25 to 35% of the material, composed of 1 to 10% $SiO_2$ and 15 to 34% $Al_2O_3$.
*Type IV.*—Oxide component 35 to 65% of the material, composed of 20 to 60% $SiO_2$ and 5 to 20% $Al_2O_3$.

In the materials of types I–IV listed above, the maximum allowable operating temperature is reduced from 1700° C. for material type I, via 1600° C. for material of type II, to 1400° C. to 1500° C. for materials of types III and IV. The reduction in allowable operating temperatures appearing between types I and IV is a result of the increasing oxide contents between types I and IV.

Material I is subject to a considerable grain growth and will therefore be brittle, whereas, material II is subject only to an insignificant grain growth and maintains a good mechanical strength also after a very long time of use.

The materials III and IV have, due to their high oxide content, a considerably higher resistance than the materials I and II which compensates somewhat for the lower operating temperature. Materials of type IV have high specific electrical resistance. The upper limit of the oxide component is 65% due to the fact that the material must have a practical degree of electrical conductivity.

While, as previously described, materials I–IV having specific compositions of oxide component as set forth, are desirably employed, the invention relates generally to materials including from 1 to 65% oxide component of which $Al_2O_3$ may be from 0 to 34% and $SiO_2$ from 1 to 65%. Materials with high oxide contents are difficult to manufacture with low porosity and, with respect to materials of type IV, it is necessary to add substances such as alkaline silicate which reduces the melting point of the silica. The quantity of alkaline silicate may be from ½ to 5% by weight of the material (counted as pure $SiO_2$ in the water glass). At the high sintering temperatures these silicates are decomposed and leave only pure silica which will be included in the oxide component.

Also other substances reducing the melting point of silica or the oxide component respectively may be used in producing said materials having a high oxide content. As additional substances reducing the melting point of silica may be counted also such impurities, for instance, $CaO$, $MgO$, $TiO_2$, $Fe_2O_3$, $Na_2O$ et cetera, which normally occur in natural and synthetical materials rich in silica.

Products employing the material according to the present invention may be manufactured according to usual powder metallurgical methods by forming a powder mixture and sintering it.

In exceptional cases so called pressure sintering in graphite forms may be used advantageously. The type of atmosphere of sintering has a critical influence on the result. If a powder of pure $MoSi_2$ is sintered in an inert gas or in hydrogen which only includes traces of oxidizing gases, for instance, less than 0.1% by volume of oxygen, there is no provable oxidation of the molybdenum disilicide and in any case there is formed less $SiO_2$ than 1% by weight of the material and the material obtained will fall outside the scope of the present invention. If the sintering of the silicide takes place in an atmosphere which includes higher content of an oxidizing gas, such as water vapor, there will occur a definite oxidation the degree of which is determined by temperature and time and the composition of the gas and also of the shape and size of the grains et cetera of the bodies to be sintered. For instance, it has been found that a protecting atmosphere having 99% by volume of hydrogen and 1% by volume of water vapor is capable of oxidizing at 1600° C. a body consisting of pure $MoSi_2$ and having a maximum grain size of 8 microns to an extent which gives a final product having the composition 98% $MoSi_2$ and 2% $SiO_2$. The sintering time is in this case 5 minutes and inasmuch as the sintered bodies already after this time were without any provable porosity there did not occur any further provable oxidation after a further sintering for a long time. If the sintering is made instead at 1500° C. it takes a longer time to close the pores and the degree of oxidation after 20 minutes in said gas is seen from a composition of 4% by weight of $SiO_2$ and the balance $MoSi_2$. However, it is not suitable to sinter too long in hydrogen, because then certain undesirable reactions may take place. Similar results may be obtained with other protective atmospheres consisting of 99% inert gas such as argon and 1% water vapor or oxygen. A microscopic examination has revealed that the silica formed extends substantially along narrow paths between the silicide crystals and appears to a very small extent in the form of discrete silica grains. The wetting action between silica and silicides has been proved to be very good and the silica has a clear function of preventing the grain growth. In the molybdenum disilicide which was sintered in the pure inert atmosphere and in which the silica content was less than 1% in the final products, the quantity of this silica is insufficient to form thin layers between the silicide grains and there will be almost no effect of assisting sintering. If the original powder mixture in addition to $MoSi_2$, also includes $TaSi_2$ or $TiSi_2$ or an oxide such as $Al_2O_3$ or aluminium silicate or silica the result obtained in sintering in a protecting atmosphere which is not entirely pure will be as above stated. On the other hand, if the sintering is made in an atmosphere including higher contents of water vapor or oxygen the oxidation will be correspondingly more intense which may be ascertained thereby that individual silica grains occur in the final product. The sintering may then also be carried out in two steps, for instance, a first sintering step within the temperature range from ordinary room temperature up to 1300° C. performed in a very pure protective atmosphere, an intermediate product being then obtained having about 20% by volume of pores. This intermediate product is then sintered in the second sintering step which may be performed in ordinary air so that a rather considerable oxidation takes place appearing partly in the formation of layers of $SiO_2$ which further the sintering between the silicide grains and, as a case may be, also between the oxide and silicide grains and partly as free silica in larger grains. The above material of type II is preferably manufactured in such a way that molybdenum disilicide to which is added silica and, if desired, tantalum disilicide, titanium disilicide and/or alumina, is mixed with a few percent of silca or, if desired, aluminium silicate and is pressed to a suitable shape and is sintered in a protective gas having about ½% oxygen at a temperature rising to 1300° C. and then further sintered in air up to a temperature of 1600° C. Products of the types I and III should be sintered at such a high temperature as possible, i.e. about 1700° C., and in a pure atmosphere containing in addition to inert gases only at most 1% by volume of oxygen. In producing the product of type I the silica formed is sufficient to facilitate sintering, whereas as regards the product III the high percentage of alumina prevents an efficient sintering and thus a higher temperature is required.

Heat resistant products employing the materials may be formed in several different ways, i.e., by cold pressing of rods, by extrusion of rods or tubes and by pressure sintering, preferably in graphite forms, of rods or in the shape of other objects having small dimensions. In the extrusion a temporary binding means, such as wax or paraffin, may be added which makes the mass supple. Such plastifying additions may be advantageously used which contain Si and which, upon oxidation and/or heating remain in the heat resistant material as $SiO_2$. Such an addition is alkaline silicate which, upon heating, is transformed to $SiO_2$. Another is organic silicate, such as ethyl silicate, which upon hydrolysis, affords a finely divided or colloidal hydrate of $SiO_2$ having a favorable influence on the progress of the sintering in which it is transformed into $SiO_2$. Also other finely divided binding means containing silica may be used. Extruded heating elements are preferably formed with an incandescent zone of small cross section and adjacent terminal zones of larger dimensions. Elements being cold pressed and pressure sintered may be brought into the desired shape by mechanical working and may be provided with cold therminal zones having larger cross sectional dimensions.

Materials of type I find their application in small furnaces and apparatus in which the operating temperature is very high. The considerable growth of the grain size of the material and its small mechanical strength confines, however, the application of this material to very special cases.

Materials of type II may be extruded to very long strings and be shaped to almost any type of element, such as loops, meanders, spirals etc. The material has a good mechanical strength and a small growth of grain and may thus be used also in average sized and large furnace plants. The moderate content of oxides in the types I and II has but an insignificant influence on the specific electrical resistance which at 1600° C. amounts to 3 to 5 ohms mm.$^2$/m. in both cases. The specific resistance at ordinary room temperature varies between 0.3 and 1.0 ohm and is higher in case the silicide component includes $TiSi_2$ or $TaSi_2$.

Material of the type III is of particular advantage whenever there are high demands on a good resistivity against temperature shocks. The coefficients of thermal expansion in respect of the two substances $Al_2O_3$ and $MoSi_2$ are practically identical and due thereto the resistivity of the product against fluctuations in temperature will be good. Material of type III is manufactured only in very small dimensions which has connection with the limited possibilities of the pressure sintering method from a practical and economical point of view.

Material of type IV having substantially $SiO_2$ as its oxide component has a good resistivity against temperature shocks, because silica is present in the form of glass having a very low coefficient of thermal expansion. Materials of this type may be extruded to strings of great length. Due to its high oxide content the mechanical strength of this material is small and it will substantially be used in bodies of small dimensions, in which the high resistance may be utilized.

Following are listed eight different practical examples of producing different materials falling within the types I to IV.

metres and thicker terminals has, for instance, at 1000° C. a resistance of 2 ohms which, at a terminal voltage of 12 volts, corresponds to a developed heat power of 72 watts.

Whereas in respect of Example 7 the specific electrical resistance at room temperature is 200 ohms mm.$^2$/m. as stated above said resistance will be as much as 8000 ohms in respect of Example 8. Considering the fact that the oxide component in Example 7 is 43% and, in the Example 8, 48% by weight of the material it is clearly un-

TABLE A

| Example No. | | 1 | 2 | 3 | 4 | 5 | 6 | 7 | 8 |
|---|---|---|---|---|---|---|---|---|---|
| Powder mixture | Maximal size of grain, μ | Percent by weight | | | | Percent by weight | | | |
| $MoSi_2$, smelted [1] | 9 | | 48 | | | | | | |
| $MoSi_2$, sintered [2] | 5 | 98 | 50 | 93 | 97 | 70 | 85 | 60 | 55 |
| $TaSi_2$ [3] | 8 | | | 7 | | | | | |
| $TiSi_2$ [4] | 8 | 2 | | | | | | | |
| Smelted corundum (99% $Al_2O_3$) | 10 | | | | | 30 | | | |
| δ-$Al_2O_3$ (from $Al_2SO_4$) | <1 | | ½ | | 3 | | | 10 | 10 |
| Caldined chamotte [5] | 6 | | | | | | | | |
| Smelted mullite [6] | 8 | | | | | | 15 | | |
| Silica-filler (98% $SiO_2$) | <1 | | 1½ | | | | | 30 | 35 |
| Kind of forming | | Cold pressing 6,000 kg./cm.$^2$ | String pressing binding medium [7] | Cold casting binding medium [8] | See below | | | String pressing binding medium [7] | Cold casting binding medium [8] |
| Presintering: Atmosphere | | $H_2$ 0.2% by volume $O_2$ | $H_2$+0.2% by volume $O_2$ | Argon + 0.2% by volume $O_2$ | See below | | | | |
| Maximal temperature ° C. | | 1,200 | 1,300 | 1,150 | | | | | |
| Corresponding time in minutes | | 30 | 20 | 15 | | | | | |
| Final sintering: Atmosphere | | Helium + 1% by volume $O_2$ | $H_2$+0.5% by volume $O_2$ | Air | Damp argon dewpoint 9° C | Pressure sintering in graphite form 150kg/cm$^2$ | | $H_2$+0.5% by volume $O_2$ | $H_2$+0.5% by volume $O_2$ |
| Maximal temperature ° C. | | 1,700 | 1,650 | 1,600 | 1,600 | 1,450 | 1,500 | 1,450 | 1,450 |
| Corresponding time in minutes | | 10 | 5 | 2 | 5 | 3 | 2 | 20 | 20 |
| Sintered-product: | | Percent by weight | | | | Percent by weight | | | |
| $MoSi_2$ | | 96 | 96 | 84 | 82 | 66 | 78 | 57 | 52 |
| $TaSi_2$ | | | | 6 | | | | | |
| $TiSi_2$ | | 2 | | | | | | | |
| $Al_2O_3$ | | | ½ | | 3 | 30 | 10 | 9 | 9 |
| $SiO_2$ | | 2 | 3½ | 10 | 15 | 5 | 12 | 34 | 39 |
| | | Percent by volume | | | | Percent by volume | | | |
| Porosity | | 2 | 5 | 1 | 3 | 9 | 7 | 6 | 9 |
| Type of material | | I | I | II | II | III | | IV | IV |

[1] Produced by smelting in electric arc furnace and in argon.
[2] Produced by reaction in hydrogen gas at 1,100° C. on a mixture of Mo-powder and Si-powder, the latter consisting of 97% Si and 2% Fe.
[3] Produced of Ta-powder, consisting 90% Ta, 10% Nb and Si-powder, by powder reaction at 1,000° C.
[4] Produced by powder reaction at 1,000° C. of titanium hydride and silicon.
[5] Consisting of 35% $Al_2O_3$, 60% $SiO_2$ and the remainder of impurity.
[6] Consisting of 70% $Al_2O_3$, 25% $SiO_2$ and the remainder of impurity.
[7] Besides temporary softening means, to 100 grams powder mixture are added 3 grams $SiO_2$ in form of hydrated silica and water to suitable consistency.
[8] To 100 grams powder mixture is added 4 grams $SiO_2$ in form of hydrated silica. Water added to casting consistency.

The material according to the above Example 7 has a specific electrical resistance of 200 ohms at ordinary room temperature and 1000 ohms at 1000° C. and may be used, for example, for cigar lighters in motor cars. A small plate having the dimensions 5 by 10 by 1 milliderstood that in this range the material rapidly goes over from being a conductor to being an electrical insulator. The upper limit for the oxide component of 65% is thus also the limit for a material having any appreciable electrical conductivity as stated in conjunction with Table A.

Below a Table B follows indicating four further examples of the invention.

TABLE B

| Example No. | 9 | 10 |
|---|---|---|
| Powder mixture, percent by weight / Maximal grain size, µ | | |
| Ti-Si, 78% Si | 4 | |
| Ti-Si₂, 54% Si | 8 | 26 |
| Ti-Si, 8% Si | 10 | |
| Zr-Si, 75% Si | 8 | |
| VSi₂, 52% Si | 6 | |
| V₃Si₃, 25% Si | 8 | |
| TaSi₂, 24% Si | 8 | |
| Ta₃Si₃, 9% Si | 10 | |
| CrSi₂, 50% Si | 6 | 18 |
| MoSi₂, 37% Si | 5 | 70 |
| MoSi, 12% Si | 10 | 34 |
| Al₂O₃ (smelted corundum) | 30–50 | |
| Al₂O₃ (Al₂SO₄ 700° C.) | <1 | 8 |
| BeO | 10 | 10 |
| ZrO₂ | 10 | |
| Y₂O₃ | 10 | |
| SiO-glass | 8 | 4 |
| SiO₂-glass plus 5% MoO₃ | 8 | 30 |
| Kind of forming | Cold pressing at 6000 kg./cm.² | |
| Presintering | At 1,000 to 1,200° C in pure protective gas (H₂ or Argon+0.2% by volume O₂). Mechanical working if desired | |
| Final sintering: Atmosphere | H₂+0.2% by volume O₂ | |
| Maximal temperature ° C | 1,650 | 1,550 |
| Duration of maximal temp. minutes | 10 | 15 |
| Final product: Silicide component, percent by weight | 87 | 57 |
| Composition of silicide component, percent by weight: | | |
| Ti | | 10 |
| Zr | | |
| V | | |
| Ta | | |
| Cr | 10 | |
| Mo | 50 | 50 |
| Si | 40 | 40 |
| Composition of oxide component, percent by weight | 13 | 42 |
| Thereof parts Al₂O₃ | 8 | |
| Thereof parts BeO | | 10 |
| Thereof parts Y₂O₃ | | |
| Thereof parts ZrO₂ | | |
| Thereof parts SiO₂ | 5 | 33 |

Example 11
Kind of forming: Addition of wax plus Na water glass and extrusion.

| Powder mixture | Percent by weight | Maximum size of grain, microns |
|---|---|---|
| TiSi₂ (54% Si) | 10 | 8 |
| MoSi₂ (37% Si) | 55 | 5 |
| MoSi (12% Si) | 5 | 10 |
| Al₂O₃ (Al₂SO₄ 700° C.) | 5 | <1 |
| SiO₂-glass plus 5% MoO₃ | 25 | 8 |

Presintering: At 1200° C. in H₂ plus 0.2% by volume of O₂.
Final sintering:
Atmosphere air.
Maximum temperature, 1,600° C.
Duration of maximum temperature, 3 minutes.
Final product, percent by weight:
Silicide component _____ 60
Ti _____ 8
Mo _____ 56
Si _____ 34
Oxide component _____ 40
Thereof Al₂O₃ _____ 5
Thereof SiO₂ _____ 35

Example 12
Kind of forming and final sintering:

| Powder mixture | Percent by weight | Maximum size of grain, microns |
|---|---|---|
| TaSi₂ (24% Si) | 15 | 8 |
| Ta₃Si₃ (9% Si) | 10 | 10 |
| MoSi₂ (37% Si) | 5 | 5 |
| MoSi (12% Si) | 6 | 10 |
| Al₂O₃(Al₂SO₄ 700° C.) | 8 | <1 |
| BeO | 47 | 10 |
| ZrO₂ | 5 | 10 |
| SiO₂-glass plus 5% MoO₃ | 4 | 8 |

Pressure sintering in graphite form 150 kgs./cm.³.
Maximum temperature, 1,500° C.
Duration of maximum temperature, 4 minutes.
Final product, percent by weight:
Silicide component _____ 36
Ta _____ 57
Mo _____ 23
Si _____ 20
Oxide component _____ 64
Thereof Al₂O₃ _____ 8
Thereof BeO _____ 47
Thereof ZrO₂ _____ 5
Thereof SiO₂ _____ 4

Example 13

100 parts of molybdenum disilicide powder having grain sizes finer than 10 microns are mixed with silica hydrate corresponding to 5 parts of silica, 5 parts of paraffin and water added to suitable workability. The plastic mixture is worked 48 hours under vacuum and extruded. The extruded rods, 7 and 14 mm. respectively, are dried and pre-sintered under pure hydrogen up to 1000° C. The rods are then pushed through a furnace under pure hydrogen at 1300–1400° C. and after that treatment they have strength enough to be handled. The porosity is now about 20% by volume and the technical composition corresponds to the raw materials used.

The rods are now sintered a few minutes in air at 1600° C. by means of direct current heating. Because of the silica addition the material can be formed by hand at 1600° C. into any desired shape. The heating in air gives a product with 0–5% porosity and a fair strength. The material is however oxidized to an extent, which corresponds to the formation of about 6% by weight SiO₂, which is formed from the silicide. The sintered product therefore contains 2 different phases: MoSi₂ and quartz glass. After a few hours at 1500–1600° C. some reaction takes place. The practical result of this reaction is that the material cannot be formed any more and thus retains its shape.

One of the most important properties of these elements is that they are completely surrounded by a very thin layer of quartz glass, which is formed when the rods are sintered in air above 1200° C. It is therefore very important that the cooler ends are also heated in oxidizing atmospheres before the welding operation.

As seen above the material of the elements contains a ceramic phase corresponding to about 10% by weight of the material. This ceramic phase is very important as it effectively stops the grain growth of the silicide.

The use of an organic silicate as a source of silica, the use of alkali metal ions to lower the melting temperature of the silica, and the use of ions of the group consisting of molybdenum, tungsten and vanadium to lower the surface tension of the silica, disclosed but not claimed in the present application, are disclosed and claimed in the copending application Serial No. 67,988, filed November 8, 1960, of Karl Herbert Joachim Medin, one of the joint inventors hereof, said application being owned by the same assignee as the present application.

What we claim is:
1. An electrically conductive material adapted for high temperatures under oxidizing conditions consisting essentially of at least 50% molybdenum disilicide sintered from a powder thereof having an average particle size less than about 10 microns while intermixed with at least one metal oxide having at least an equally fine particle size of the group consisting of $SiO_2$, $Al_2O_3$ and combinations thereof, said oxide component constituting at least 1% and up to 50% by weight of the material and containing from 0 to 34% of alumina by weight of said mixture, said material containing at least about 1% of quartz glass, said quartz glass being distributed throughout said material, said sintering having been carried out at least initially in an atmosphere selected from the group consisting of the noble gases, hydrogen and such gases containing small amounts of an oxygen-containing gas, the amount of said component and said powder being such as to facilitate the sintering of the powder without rendering the sintered powder electrically non-conductive, said material being resistant to prolonged temperatures in the range 1500–1700° C. in air and having a porosity not greater than 10%.

2. The material described in claim 1 in which the oxide component is not more than about 20% of the material by weight and the alumina content is not more than about 3%.

3. The material described in claim 1 in which the oxide component is 25 to 35%, the $SiO_2$ content not more than about 10%, and the $Al_2O_3$ content is 15 to 34% by weight of the material.

4. The material described in claim 1 in which the oxide component is 35 to 50%, the $SiO_2$ is 20 to 50%, and the $Al_2O_3$ content is 5 to 20% by weight of the material.

5. A sintered molybdenum disilicide composition having the characteristics of (1) being relatively plastic for shaping at elevated temperatures for a time period and (2) thereafter becoming comparatively rigid, said composition consisting essentially of 99 to 35% molybdenum disilicide and from 1% up to 65% silica sintered from a powder mixture having an average particle size less than about 10 microns, said sintering having been carried out at least initially in an atmosphere selected from the group consisting of the noble gases, hydrogen and such gases containing small amounts of an oxygen-containing gas, said composition containing at least about 1% of silica formed by oxidation of said molybdenum disilicide during sintering, said composition being resistant to prolonged temperatures in the range 1500–1700° C. in air and having a porosity not greater than 10%.

6. A material adapted to be used at elevated temperatures under oxidizing conditions and consisting essentially of molybdenum disilicide of an average particle size less than about 10 microns, at least 1% by weight of at least one refractory metal oxide having at least an equally fine particle size of the group consisting of $SiO_2$, $Al_2O_3$, and combinations thereof, said silicide constituting at least 35% and said oxide component constituting up to 65% by weight of the material, said material containing quartz glass and containing no other $SiO_2$, the amount of said quartz glass being at least 1% by weight of the material expressed as $SiO_2$, said quartz glass being distributed throughout said material, said material having been sintered at least initially in an atmosphere selected from the group consisting of the noble gases, hydrogen and such gases containing small amounts of an oxygen-containing gas, said material being resistant to prolonged temperatures in the range 1500–1700° C. in air and having a porosity not greater than 10%.

7. The material described in claim 6 in which substantially all of the $SiO_2$ present is quartz glass formed in situ.

8. The material described in claim 1 in which the oxide component is $Al_2O_3$ and is not more than about 20% of the material by weight and in which substantially all of the $SiO_2$ present is quartz glass formed in situ.

9. A process for making sintered refractory metal silicide material, said process comprising mixing colloidal silica with molybdenum disilicide in a finely divided form of an average particle size less than about 10 microns, and forming and sintering the resultant mixed material, said sintering being carried out at least initially in an atmosphere selected from the group consisting of the noble gases, hydrogen and such gases containing small amounts of an oxygen-containing gas, said molybdenum disilicide constituting 99 to 35% by weight of the material and said silica constituting 1% to 65% by weight of the material, said material being resistant to prolonged temperatures in the range 1500–1700° C. in air and having a porosity not greater than 10%.

10. The process of claim 9 in which silica is incorporated in the form of silica hydrate, which during heating produces a dispersion of silica.

11. The process of claim 9 in which the material becomes soft during said sintering under oxidizing conditions and is shaped by mechanical force applied thereto.

References Cited in the file of this patent

UNITED STATES PATENTS

| | | |
|---|---|---|
| 2,747,260 | Carlton et al. | May 29, 1956 |
| 2,768,087 | Bird | Oct. 23, 1956 |

FOREIGN PATENTS

| | | |
|---|---|---|
| 478,016 | Great Britain | Jan. 11, 1938 |

UNITED STATES PATENT OFFICE
CERTIFICATE OF CORRECTION

Patent No. 3,027,330                          March 27, 1962

Nils Gustav Schrewelius et al.

It is hereby certified that error appears in the above numbered patent requiring correction and that the said Letters Patent should read as corrected below.

Column 1, line 18, for "now" read -- low --; column 8, line 4, for "silca" read -- silica --; line 42, for "therminal" read -- terminal --; columns 9 and 10, TABLE A, column 1, line 5 thereof, for "(99% $Al_2O_4$)" read -- (99% $Al_2O_3$) --; same TABLE A, under columns headed "1" and "2", line 9 thereof, for "$H_2O.2\%$" read -- $H_2+0.2\%$ --; same TABLE A, column 6, line 13 thereof, for "5" read -- 4 --; same TABLE A, in footnote 5 thereof, for "reaminder" read -- remainder --; column 11, TABLE B, column 1, line 13 thereof, before "$Al_2O_3$" insert -- $\delta$ --; same TABLE B, column 1, line 17 thereof, for "SiO-glass" read -- $SiO_2$-glass --; same TABLE B, column 3, line 38 thereof, for "42" read -- 43 --.

Signed and sealed this 11th day of September 1962.

(SEAL)
Attest:

ERNEST W. SWIDER                          DAVID L. LADD
Attesting Officer                            Commissioner of Patents

UNITED STATES PATENT OFFICE
CERTIFICATE OF CORRECTION

Patent No. 3,027,330                             March 27, 1962

Nils Gustav Schrewelius et al.

It is hereby certified that error appears in the above numbered patent requiring correction and that the said Letters Patent should read as corrected below.

Column 1, line 18, for "now" read -- low --; column 8, line 4, for "silca" read -- silica --; line 42, for "therminal" read -- terminal --; columns 9 and 10, TABLE A, column 1, line 5 thereof, for "(99% $Al_2O_4$)" read -- (99% $Al_2O_3$) --; same TABLE A, under columns headed "1" and "2", line 9 thereof, for "$H_2O.2\%$" read -- $H_2+0.2\%$ --; same TABLE A, column 6, line 13 thereof, for "5" read -- 4 --; same TABLE A, in footnote 5 thereof, for "reaminder" read -- remainder --; column 11, TABLE B, column 1, line 13 thereof, before "$Al_2O_3$" insert --b --; same TABLE B, column 1, line 17 thereof, for "SiO-glass" read -- $SiO_2$-glass --; same TABLE B, column 3, line 38 thereof, for "42" read -- 43 --.

Signed and sealed this 11th day of September 1962.

(SEAL)
Attest:
ERNEST W. SWIDER
Attesting Officer

DAVID L. LADD
Commissioner of Patents